Aug. 15, 1950     R. C. SCHULTE     2,518,498
PROPULSION SYSTEM FOR AIRCRAFT

Filed March 25, 1946     2 Sheets-Sheet 1

INVENTOR
RUDOLPH C. SCHULTE
BY
ATTORNEY

INVENTOR
RUDOLPH C. SCHULTE
ATTORNEY

Patented Aug. 15, 1950

2,518,498

UNITED STATES PATENT OFFICE 2,518,498

PROPULSION SYSTEM FOR AIRCRAFT

Rudolph Carl Schulte, Alexandria, Va.

Application March 25, 1946, Serial No. 656,949

5 Claims. (Cl. 170—135.71)

(Granted under the act of March 3, 1883, as amended April 30, 1928; 370 O. G. 757)

The invention described herein may be manufactured and used by or for Government for governmental purposes, without the payment to me of any royalty thereon.

This invention relates generally to devices and/or systems for aerial propulsion, and specifically to gas turbine systems for driving propellers.

My invention provides an arrangement whereby the aircraft is efficiently propelled by a combination of propellers and jet reaction thrust; the latter being more commonly known as "jet propulsion."

I am aware of previous efforts to provide for propulsion of aircraft by a combination of propeller and jet reaction thrust, but so far as I am cognizant, such systems for aerial propulsion by a combination of propellers and "jet propulsion" as are now in existence, are all characterized by having a propeller driven by the gas turbine or jet reaction apparatus through a shaft which is connected directly to the composite compressor-turbine shaft by gearing. Such systems have for one reason or another, well known to those skilled in this particular art, certain disadvantages. It is therefore an object of this invention to provide a combination propeller thrust and jet thrust propulsion system for aircraft which will have a horsepower output of greater flexibility, and which will otherwise fulfill more satisfactorily all requirements of power plants for aerial propulsion, than other power plants, combining propeller and jet reaction thrusts, heretofore employed.

According to my invention there is combined in a propulsion system for aircraft, a port and a starboard propelling unit. Each unit embodies what may be termed a central jet reaction unit which will be hereinafter referred to as a turbo-jet, and a combination propeller and jet thrust at each side of the central turbo-jet; the central turbo-jet being preferably a compressor-burner-gas turbine which, in effect, divides the air output from the compressor into a stream which is utilized to provide the energy for driving the compressor through the turbine and to contribute to the thrust by fluid reaction, and also into streams which are utilized to provide both the energy for driving the propellers through turbines that in turn are in driving connection with the propellers, as well as to also contribute to the thrust by fluid reaction.

The invention is further to be understood by reference to the following detailed description read in connection with the accompanying drawings in which is illustrated what is presently considered a preferred embodiment of the invention, and wherein;

Figure 2a is a fragmentary enlarged detail horizontal sectional-elevational view, with certain parts broken away for purposes of illustrating a conventional throttling mechanism and control means.

Figure 1:
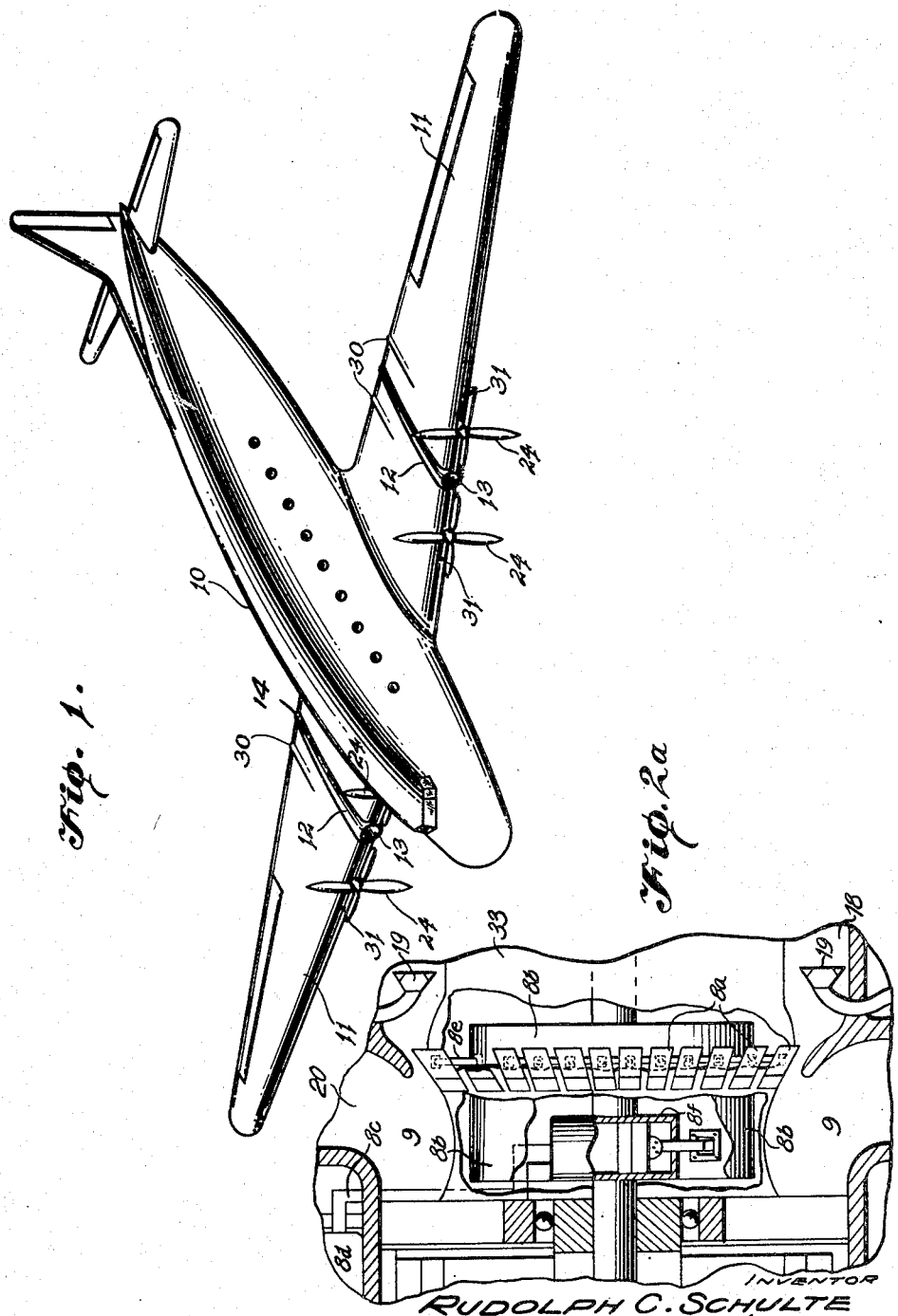
Figure 1 is a perspective view of an airplane embodying my invention.

Referring to the accompanying drawings, an aircraft of modern design, which includes a fuselage 10 having wings 11 extending from each side thereof, is shown in Figure 1 for the purpose of illustrating the general manner in which my system for aerial propulsion may be used.

Figure 2:
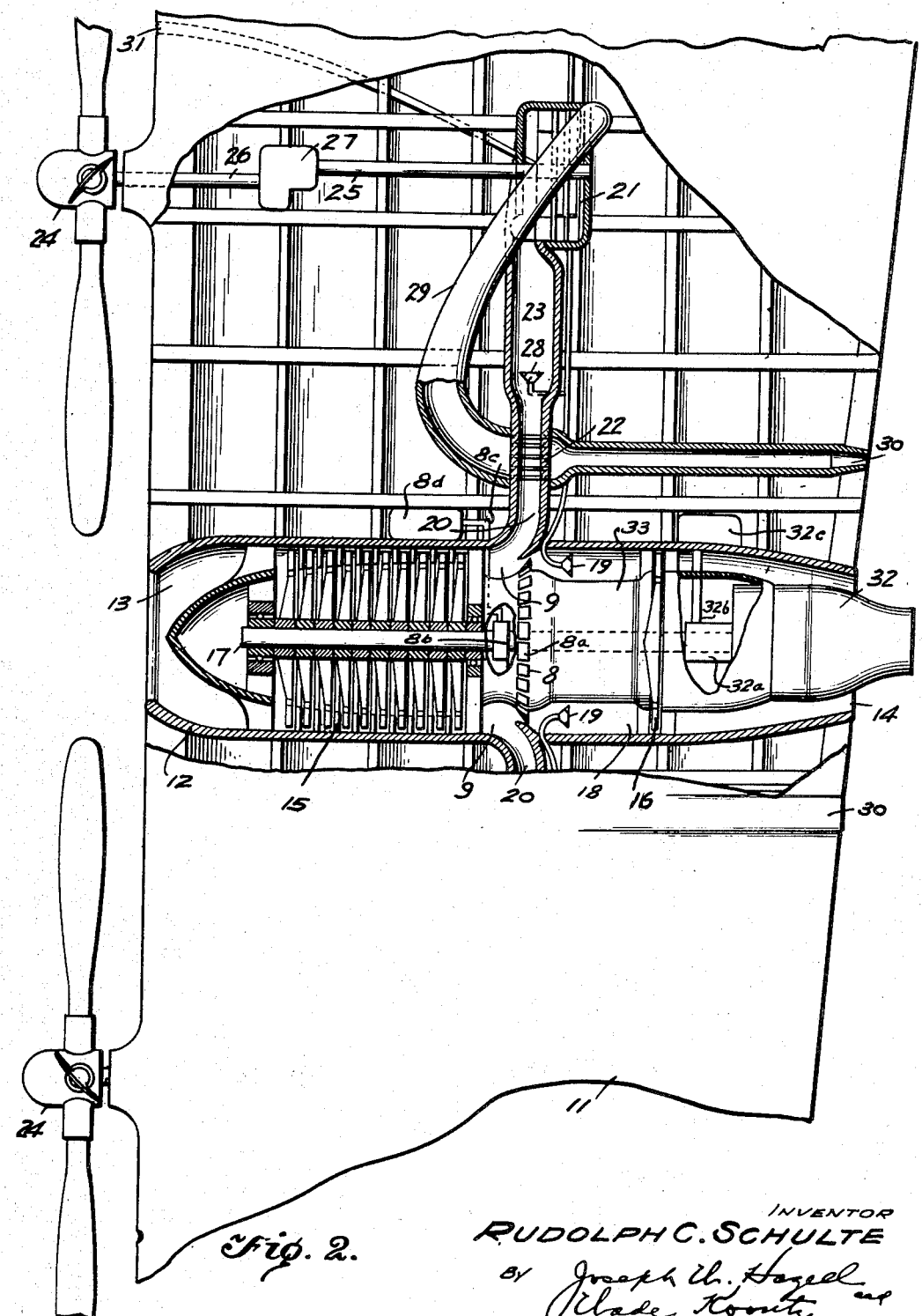
Figure 2 is an enlarged partial section in plan for more fully illustrating my combined propeller and jet reaction aircraft propulsion system.

Considering my aerial propulsion device as comprising virtually a port and a starboard propelling unit, only one unit is illustrated in detail and will be so described, the other being substantially identical. Also the propelling units, mounted in the wings 11, one on each side of the fuselage 10, being, respectively, in the nature of a twin apparatus comprising a central turbo-jet, a divided air output, and a combination propeller and jet thrust at each side of the central turbo-jet, only one side of each such twin apparatus is detailed in the drawings (see Figure 2) and hereinafter particularized.

Each propelling unit comprises a nacelle or duct 12 provided in the wing 11 and having a forwardly facing "ramming" air intake orifice 13 and a rearwardly facing outlet or propulsion nozzle 14.

While in the present instance I have shown the nacelle 12 as housing within the forward end thereof an axial flow compressor 15, it is to be understood that a centrifugal-axial flow compressor could be used with equal advantage. Also located within the nacelle 12 is a driving turbine 16 that is located behind the compressor and drives the latter through the medium of shaft 17.

Air is taken into the system through what is generally termed a "ramming" air intake which in this instance is the orifice 13 provided for the nacelle 12 and located on the leading edge of the wing 11 to take full advantage of the velocity of the plane through the air. This atmospheric air is compressed in a compressor 15 and delivered to a plenum chamber 9 provided within the nacelle 12. In the plenum chamber 9, the air output from the compressor 15 is divided into streams, one of which passes to the annular combustion chamber 18 provided within the nacelle 12 and equipped with fuel-burning means 19, arranged as may be found to be the most advantageous. From the combustion chamber 18, the effluent passes directly into the turbine 16 and discharges therefrom through the propulsion nozzle 14 at the trailing edge of wing 11, where it is used to produce a high velocity jet productive of thrust by reaction.

As is apparent, the flow from the combustion chamber and through the turbine operates the latter, the mechanical output of which drives the compressor 15 through the shaft 17. Here it may be mentioned that any of the well known starting devices and/or well known manners for starting jet engines may be employed, and such forming no part of the present invention, have not been herein illustrated.

Streams resulting from the divided air output of compressor 15 also pass from the plenum chamber 9 through conduits 20 which lead to propeller-driving turbines 21, located one on each side of the nacelle 12. Turbine 21, as shown, is preferably of the multi-stage type and its mechanical output drives the propeller 24 with which the turbine 21 is in driving connection by shafting 25, 26 and reduction gearing, the latter being encased within a housing 27.

The propeller 24, as shown, is located at the leading edge of the wing and provides the major contributing thrust for propelling the aircraft. Also, the propeller 24 is of the multiblade type having incorporated therein automatically operable blade pitch changing mechanism to the end that the propeller will rotate at optimum propulsion efficiency under all conditions of load. Here it may be also mentioned that the reduction gearing unit in housing 27 will be of the type suitable for either a single rotation, or counter rotating, co-axial, propeller depending upon the airplane requirements and total power output of the propulsion unit.

The amount of air supplied to the turbines 21 is controlled by adjustment of a tail cone 32 through the medium of a conventional adjusting mechanism 32a, 32b, and 32c for varying the exhaust nozzle area 14 and/or by adjustment of any conventional throttling mechanism 8 which includes, for example, hinge flaps 8a supported on member 33 in the region of the plenum chamber 9 (see Figure 2) and adapted to be raised and lowered by suitable controlled means 8b, 8c, and 8d, to vary the flow area between the plenum chamber 9 and the combustion chamber 18. For purposes of illustration only, and not as of the essence of this invention, the mentioned controlled means are herein fragmentarily shown as comprising an oscillating annulus 8b connected with the flaps 8a by links 8e for swinging the flaps on their hinge connections with the member 33 in response to oscillatory movement imparted to the annulus by a hydraulic ram 8f, the piston of which is suitably connected with the annulus and the cylinder of which is in closed circuit through the medium of conduit means 8c with a suitable hydraulic pump assembly 8d under the control of the operator. Adjustable tail cones such as shown herein and indicated at 32, and throttling mechanism such as just referred to and shown at 8, are not new in this art and since the details of the adjusting and control mechanisms therefor are well known and form no part of the present invention, they have not been herein particularized, except to the extent shown in Figure 2a and as hereinafter referred to.

Each of the conduits 20 is provided with a heat exchanger 22 and a combustion chamber 23, the latter being located between the heat exchanger 22 and the intake for the turbine 21.

Also arranged in the combustion chamber 23 is a fuel burning means 28 of any suitable or known type and preferably of the same type as that referred to in relation to the combustion chamber 18. Here it may also be mentioned that the fuel burning means 19 and 28, as to construction and also as to arrangement within the respective combustion chambers 18 and 23, are not of the essence of my invention and consequently further detailed description thereof is deemed unnecessary.

The hot gas discharge of the turbine 21 is used for pre-heating the air output of the compressor 15 diverted to the turbine 21 and also for contributing to the propulsion thrust by fluid reaction. To this end the hot gas discharge of the turbine 21 is led therefrom by a duct 29 that intersects and communicates with duct 20 at the point in the latter where heat exchanger 22 is located, so that the effluent passes into the heat exchanger for effecting a rise in temperature in the diverted air output of compressor 15 before such diverted air enters the combustion chamber 23. The exhaust gases are discharged to the atmosphere through a propulsion nozzle 30 which is a continuation of duct 29 and is located at the trailing edge of the wing adjacent to the propulsion nozzle 14. The gases emitted from the nozzle 30 produce a high velocity jet which contributes to the propulsion thrust by fluid reaction.

By passing the diverted air output of compressor 15 through the heat-exchanger 22, a material increase in the temperature of the diverted air is effected and by this preheating of the compressed air, desired maximum temperature of the air in the combustion chamber is attained and a constant pressure therein maintained with minimum fuel consumption, and rotation of the propeller and ejection of the air through the nozzle 30 effected in a manner providing greatest possible propulsive efficiency.

In addition to the just stated manner in which economy of fuel consumption is affected, a further saving of fuel results from the fact that a higher compression ratio is utilized in the compressor 15 of my aerial propulsion device and/or system than in the compressor of any aerial propulsion device and/or system now known or in existence. In my propulsion device and/or system, while the "ramming" intake orifice 13 is located on the leading edge of the wing and thereby takes full advantage of the velocity of the aircraft through the air, there is no propeller mounted directly in front of the orifice as is the case with those compressor-gas turbine systems now in existence. Hence with my device and/or system the generally undesirable conditions (known to those experienced in the field of "jet propulsion" and hence not necessary to herein enumerate) of air entry into the compressor as are characteristic of a propeller-driving gas turbine system for aerial propulsion are eliminated, and I obtain what may be aptly termed a "free ram" at the orifice 13 where the air is taken into the system, and hence a compressor having a higher compression ratio than is obtainable with other gas turbine systems for aerial propulsion may be used in my system and with resulting economy in fuel consumption.

It is suggested that the parts of the turbine 21 be of high temperature-resistant materials for best efficiency. Also a substantial supply of cooling air for the turbine at all times is secured by providing therefor, a forwardly extending air inlet duct 31. This duct 31 is provided in the wing 11 and has its intake orifice located on the leading edge of the wing so that air from the atmosphere is delivered by the duct to the turbine 21 around the parts of which the cooling air flows. It is also contemplated that the intake orifice for duct 31 be located with respect to the proximate propeller 24 so that full advantage may be taken of the revolving propeller for forcing air into and through the turbine 21 for cooling purposes when the airplane is not actually in flight. In this connection it will also be appreciated that with the intake orifice located on the leading edge of the wing, full advantage of the velocity of the craft through the air for effecting a high circulation of air for cooling purposes around the turbine parts is also taken, to the end that a substantial supply of cooling air for the turbine at all times is ensured.

From the foregoing, it will be seen that I have provided an aerial propulsion and/or system whereby an aircraft is propelled through a combination of jet thrust and propeller thrust that is readily adaptable to any multi-propeller aircraft, either military or civil, having a speed range of from 300–450 M. P. H. Also as should be apparent from the foregoing, the system contemplated by this invention is very flexible in operation thereby making possible lower specific fuel consumption than is possible with any existing aircraft gas turbine propulsion system.

A high propulsive efficiency is maintained with my propulsion system by the following operative procedure: during the take-off and initial climb of the aircraft, when propeller thrust is more efficient than jet thrust, the maximum amount of compressed air is furnished to the turbines 21 that drive the propellers, thus furnishing to the propellers a maximum amount of shaft horsepower. This is accomplished by adjusting the exhaust nozzle area of the central turbo-jet of the propelling unit through the medium of the adjustable cone 32, and by an adjustment of the throttling mechanism 8 so as to force a greater percentage of the total air output of compressor 15 through the passages 20 for supplying the turbines 21. Just enough air is supplied to the combustion chamber of the central or "turbo-jet" unit to operate the compressor 15 at the most suitable speed. As the speed of the aircraft increases, the amount of compressed air directed to the turbines 21 is gradually decreased by proper adjustment of the aforementioned throttling means 8 and 32 so that the thermal energy of the gas is gradually converted from propelling thrust to jet thrust for, at high speed, jet thrust is more efficient than propeller thrust. In this connection it may be observed that the propellers 24 operating at constant speed and having automatic blade pitch-changing mechanism incorporated therein, will rotate at optimum efficiency under all conditions of load.

For long range cruising at intermediate speeds the lowest specific fuel consumption is realized by utilizing the maximum amount of propeller thrust, as for take-off and climb conditions.

It will also be found in actual practice that in comparison with conventional aerial propulsion devices or systems now in use, my system produces less noise and reduces to a minimum, if not entirely eliminates, engine vibration.

While I have described my invention in detail in its present preferred embodiment, it will of course be understood that I have done so for purpose of illustration only and not for purpose of limitation, and therefore only such limitations are to be imposed thereon as may come within the scope of the appended claims.

What I claim is:

1. In a propulsion system for aircraft, a combination of an air compressor, a gas turbine connected to and driving said compressor, a combustion chamber intermediate the compressor and turbine, an adjustable propulsion nozzle, adjustable throttling mechanism for dividing the output from the compressor into a stream which is passed through the combustion chamber for supplying gas under pressure for said turbine and is passed out through the propulsion nozzle and a second stream, a combustion chamber supplied by the second stream, a propeller, and a turbine supplied by the effluent gas from the last mentioned combustion chamber and driving said propeller.

2. In a propulsion system for aircraft, the combination of an air compressor, a gas turbine connected to and driving said compressor, a combustion chamber intermediate the compressor and turbine, a propeller, a gas turbine connected to and driving said propeller, a combustion chamber intermediate said compressor and the propeller-driving turbine, and means including an adjustable throttling mechanism for dividing the air output from the compressor into one stream which is passed through the first mentioned combustion chamber for supplying gas under pressure to the compressor-driving turbine and also to contribute to the thrust by fluid reaction and into another stream which is passed through the second mentioned combustion chamber for supplying gas under pressure to the propeller-driving turbine and also to contribute to the thrust by fluid reaction.

3. In a propulsion system for aircraft, the combination of an air compressor, a combustion chamber, a gas turbine connected to and driving the compressor, means for dividing the air output from the compressor into streams one of which is passed through the combustion chamber for supplying motive fluid for the turbine, means for utilizing the exhaust gases from the turbine for contributing to the thrust by fluid reaction; a propeller, a second combustion chamber, a gas turbine in driving connection with the propeller, another of said streams being directed to pass through the second combustion chamber for supplying motive fluid to the propeller-driving turbine, and respective means for utilizing the exhaust gases from the last mentioned turbine for heating the air prior to its passage through the second combustion chamber and for contributing to the thrust by fluid reaction, respectively.

4. In a propulsion system for aircraft, a pure jet thrust assembly comprising an air compressor, burner, gas turbine, a controlled variable area exhaust nozzle, means for controlling said nozzle, an adjustable throttling mechanism, means for adjusting the throttling mechanism, and wherein the compressor is driven by the gas turbine; propeller-jet propulsion thrust assemblies each comprising a propeller, burner, gas turbine and propulsion nozzle, and wherein the propeller is driven by the turbine of such assembly; and a divided outlet for the air output of the compressor located in the region of said adjustable throttling mechanism directly connected with the respective gas turbine of the several propulsion thrust assemblies.

5. A combination propeller and jet thrust propulsion assembly for aircraft comprising combined propeller and contributing jet thrust assemblies each including a propeller-driving gas turbine, a pure jet propulsion thrust assembly including a gas turbine and a compressor driven thereby, said compressor constituting a single source of air supply common to all the turbines and having individual air-feed conduit connections with the respective turbines, and said pure jet propulsion thrust assembly embodying an adjustable tail cone and an adjustable throttling mechanism for controlling the supply of air from the compressor to the turbines of the combined propeller and contributing jet thrust assemblies and the pure jet propulsion thrust assembly, respectively.

RUDOLPH CARL SCHULTE.

REFERENCES CITED

The following references are of record in the file of this patent:

UNITED STATES PATENTS

| Number | Name | Date |
|---|---|---|
| 2,280,835 | Lysholm | Apr. 28, 1942 |
| 2,356,746 | Boushey | Aug. 29, 1944 |
| 2,385,366 | Lysholm | Sept. 25, 1945 |
| 2,411,227 | Planiol et al. | Nov. 19, 1946 |

FOREIGN PATENTS

| Number | Country | Date |
|---|---|---|
| 513,751 | Great Britain | Oct. 20, 1939 |
| 541,349 | Great Britain | Nov. 24, 1941 |
| 877,590 | France | Sept. 7, 1942 |

OTHER REFERENCES

"Flight" Magazine published May 13, 1943, pages 496 to 498.

"Flight" Magazine published February 17, 1944, page 171.

Smith: "Gas Turbines and Jet Propulsion," page 64, edition of 1944.